United States Patent [19]
Van Puijenbroek

[11] Patent Number: 5,936,580
[45] Date of Patent: Aug. 10, 1999

[54] MULTI-SECTOR ANTENNAE CONFIGURATION HAVING VERTICAL AND HORIZONTAL DISPLACED ANTENNA PAIRS

[75] Inventor: Cornelis Adrianus Henricus Maria Van Puijenbroek, Onlandhorst, Netherlands

[73] Assignee: Ericsson Inc., Research Triangle Park, N.C.

[21] Appl. No.: 08/764,991

[22] Filed: Dec. 16, 1996

[51] Int. Cl.[6] .............................. H01Q 3/02; H01Q 21/20
[52] U.S. Cl. ................................. 343/700 MS; 343/797; 343/800; 343/891
[58] Field of Search ............................. 343/700 MS, 797, 343/800, 891

[56] References Cited

U.S. PATENT DOCUMENTS

| | | | |
|---|---|---|---|
| 4,062,019 | 12/1977 | Woodward et al. | 343/797 |
| 4,446,465 | 5/1984 | Donovan | 343/797 |
| 4,509,055 | 4/1985 | Fassett | 343/754 |
| 5,203,018 | 4/1993 | Hirose | 455/61 |
| 5,204,688 | 4/1993 | Loiseau et al. | 343/800 |

FOREIGN PATENT DOCUMENTS 0 218 843  12/1986  European Pat. Off. .

OTHER PUBLICATIONS

Yamada, et al, *Base Station/Vehicular Antenna Design Techniques Employed in High–Capacity Land Mobile Communications System,* Review of the Electrical Communications Laboratories, vol. 35, No. 2, 1987.

*Primary Examiner*—Donald Hajec
*Assistant Examiner*—Daniel St. Cyr
*Attorney, Agent, or Firm*—Jenkens & Gilchrist

[57] ABSTRACT

An improved antenna configuration that is both structurally symmetric and maximizes diversity gain through spatial displacement of antenna pairs. Individual antenna of each antenna pair is placed in adjacent and spaced-apart antenna assemblies where each antenna of an antenna pair is both horizontally and vertically displaced from its twin.

8 Claims, 4 Drawing Sheets

MULTI-SECTOR ANTENNAE CONFIGURATION HAVING VERTICAL AND HORIZONTAL DISPLACED ANTENNA PAIRS

BACKGROUND OF THE PRESENT INVENTION

1. Field of the Invention

The present invention relates generally to an antennae system for a telecommunications system, particularly to an improved antennae system configuration.

2. Background and Objects of the Present Invention

The evolution of wireless communication over the past century, since Guglielmo Marconi's 1897 demonstration of radio's ability to provide continuous contact with ships sailing the English Channel, has been remarkable. Since Marconi's discovery, new wireline and wireless communication methods, services and standards have been adopted by people throughout the world. This evolution has been accelerating, particularly over the last ten years, during which time the mobile radio communications industry has grown by orders of magnitude, fueled by numerous technological advances that have made portable radio equipment smaller, cheaper and more reliable. The exponential growth of mobile telephony will continue to rise in the coming decades as well, as this wireless network interacts with and eventually overtakes the existing wireline networks.

In order to facilitate the rapid expansion of cellular and other wireless telephonic uses there is a need for an improved infrastructure of reception and transmission apparatus to handle the increasing load and provide better coverage. More particularly, there is a need for an improved antennae system configuration at a base station node.

Shown in FIG. 1 is an example of an antennae system 10 presently in use. The antennae system 10 has two spaced-apart antennae clusters 12A and 12B, each having six antennae numbered 14A–14F, as illustrated. The individual antennae in one cluster are paired with the corresponding antennae in the other cluster, e.g., antenna $14A_1$ in cluster 12A is paired with antenna $14A_2$ in cluster 12B, as illustrated. Further, the six individual antennae within each cluster are mounted side-by-side to provide omni-directional coverage, e.g., 6 geographical sectors of 60 degrees each. It should be understood that a given antenna pair, e.g., antennae $14A_1$ and $14A_2$, may constitute a part of a base station transceiver for mobile radio frequency (RF) telecommunication.

With reference also to FIG. 2, antennae clusters 12A and 12B are mounted on poles 16A and 16B, respectively, of a crossbar or support 16. As illustrated, antennae clusters 12A and 12B are both horizontally and vertically spaced apart. As is understood in the art and as will be discussed more fully hereinafter, such spatial separation between antenna pairs is necessary to achieve diversity gain, i.e., an increase in reception capability, allowing a reduction in received signal power for the same performance. As shown in FIG. 1, antennae diversity in this conventional configuration is achieved by spatially offsetting an antenna pair, e.g., the aforementioned antenna $14A_1$ in antennae cluster 12A and the corresponding pair element $14A_2$ in antennae cluster 12B. In the Ericcson DECT Radio Access (DRA1900) System, for example, which uses a configuration similar to that illustrated in FIGS. 1 and 2, antennae clusters 12A and 12B are horizontally offset by approximately 2 meters and vertically offset by about 1 meter. The actual separation distance, computed using the Pythagorean theorem, is approximately 2.23 meters, the horizontal component being dominant.

Several technological disadvantages of the antennae construction 10 of FIGS. 1 and 2 are apparent, however, which are eliminated or ameliorated by the configuration of the present invention, described hereinafter. First, the antennae construction 10 is mechanically unbalanced, particularly with regard to wind load, increasing the chance of mechanical failure. Second, in one direction, i.e., along one or two of the geographical sectors of coverage, one cluster shadows the other, reducing the diversity gain. For example, antennae cluster 12B shadows at least a part of the coverage of antennae $14B_1$ and $14C_1$ in antennae cluster 12A. Diversity gain is also adversely affected by the unequal length of antenna cables (not shown) to the respective antennae clusters 12A and 12B. As is understood in the art, if the cables are unequal in length, there is unequal cable loss (dB) between the two antennae clusters, unbalancing the radiated power of the respective antennae 14 and reducing the diversity gain. An additional problem is horizontal separation variance. Since horizontal antennae separation in most propagation environments is more effective than vertical separation and is therefore the main contributor to diversity gain, to maximize such gain, particularly in the horizontal or azimuthal plane, the horizontal separation should be between about 2 to 4 meters to achieve about 10dB in diversity gain. Distances below about 2 meters have greatly reduced effectiveness with almost all diversity gain lost at about 1 meter separation. Distances beyond this range generally do not add to the approximately 10dB in gain, and become mechanically complex when larger than about 4 meters. Conventional antennae apparatus vary this horizontal distance somewhat, particularly, by providing spacing outside this optimum range, thereby either losing the benefits of diversity gain or wasting space.

As a result of the aforedescribed horizontal separation variance and shadowing due to the configuration of the mechanical support structure, the diversity gains in conventional antennae systems 10 vary accordingly. More particularly, diversity gain varies as a function of the angle between a first line drawn from the base station, i.e., an antenna pair discussed hereinafter, to the mobile subscriber or other wireless unit and a second line drawn between the two antennae clusters 12A and 12B. Thus, in existing antennae systems, such as those employing the configuration illustrated in FIGS. 1 and 2, diversity gain is not constant over the full 360 degrees. Further, the coverage area shape may be distorted, complicating cell planning. Lastly, since the mechanical support structure is unbalanced, additional costs and complications are added to antennae site construction.

It is in light of this background information related to antennae configuration and support structures that the significant improvements of the present invention have evolved.

It is, accordingly, an object of the present invention to provide an improved antennae support structure that overcomes or reduces the aforedescribed disadvantages of presently existing systems.

It is a more particular object of the present invention to provide a more balanced and structurally symmetric antennae system.

It is also an object of the present invention to provide an antennae system which maximizes diversity gain, and provides improved geographic uniformity in area coverage.

SUMMARY OF THE INVENTION

The present invention advantageously provides an improved antennae configuration that is both structurally symmetric and maximizes diversity gain through spatial displacement of antenna pairs. Individual antennae of each antenna pair are placed in adjacent and spaced-apart antennae assemblies where each antenna of an antenna pair is both horizontally and vertically displaced from its twin.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION OF THE PRESENT INVENTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
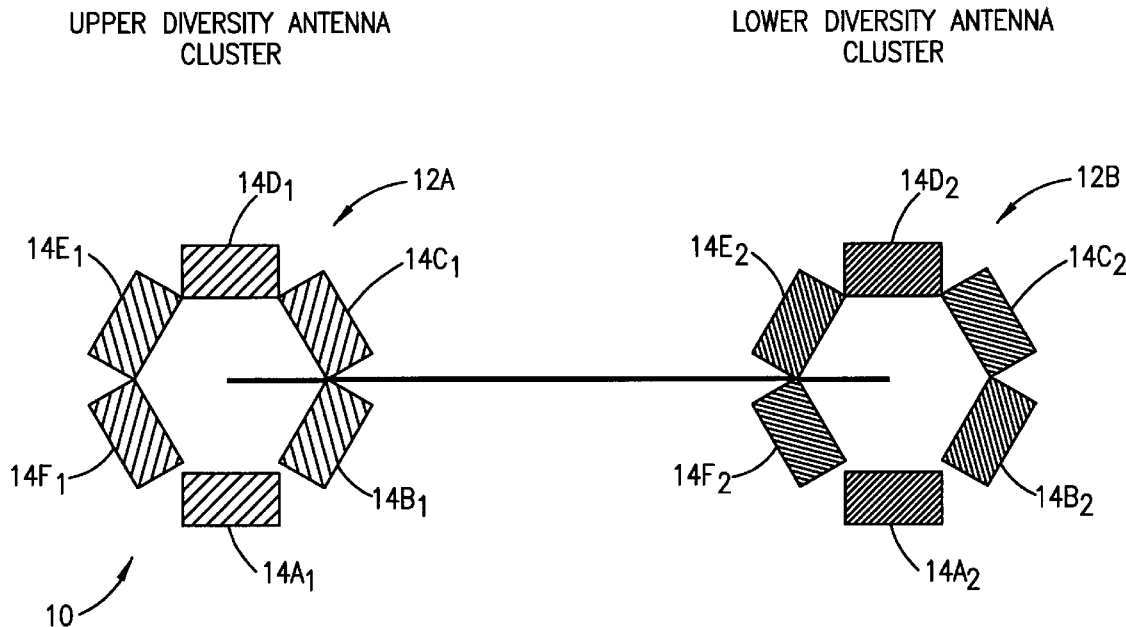
FIG. 1 is a top view of a conventional antennae configuration illustrating the horizontal displacement between the two antennae clusters and the antennae configuration therein.
Figure 2:
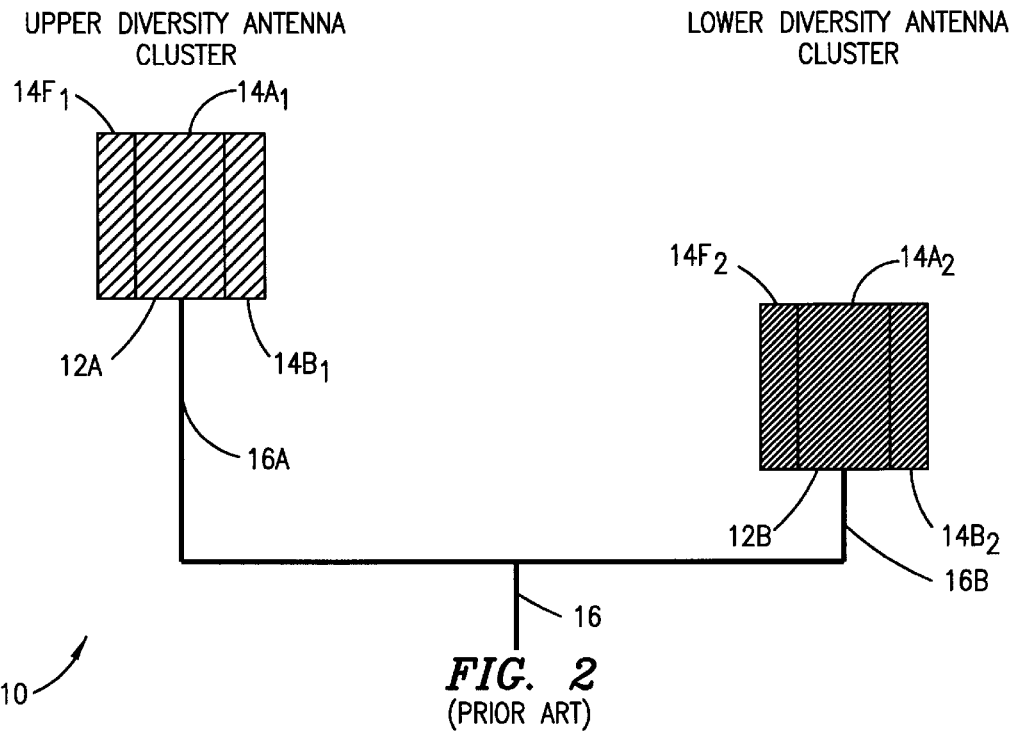
FIG. 2 is a side view of the conventional antennae configuration of FIG. 1 illustrating both horizontal and vertical antennae cluster displacement.

As with the conventional antennae system shown in FIGS. 1 and 2, an antennae system in accordance with the present invention also provides omni-directional RF coverage in the horizontal plane, i.e., 360 degrees of geographical area coverage about a common point of reference, the antennae system itself. In a preferred construction, the 360 degrees are divided into six equivalent geographic sectors of 60 degrees with a respective base station transceiver serving each sector, i.e., transmitting to and receiving RF signals from a multiplicity of mobile or other wireless subscribers within the respective sector. As will be discussed, an antenna pair constitutes the communications part of each base station transceiver. It should be understood that the base station transceivers (antenna pairs) preferably use conventional Time-Division Duplex (TDD) or Time-Division Multiple Access (TDMA) technology handling a multiplicity of simultaneous duplex voice links.

Figure 3:
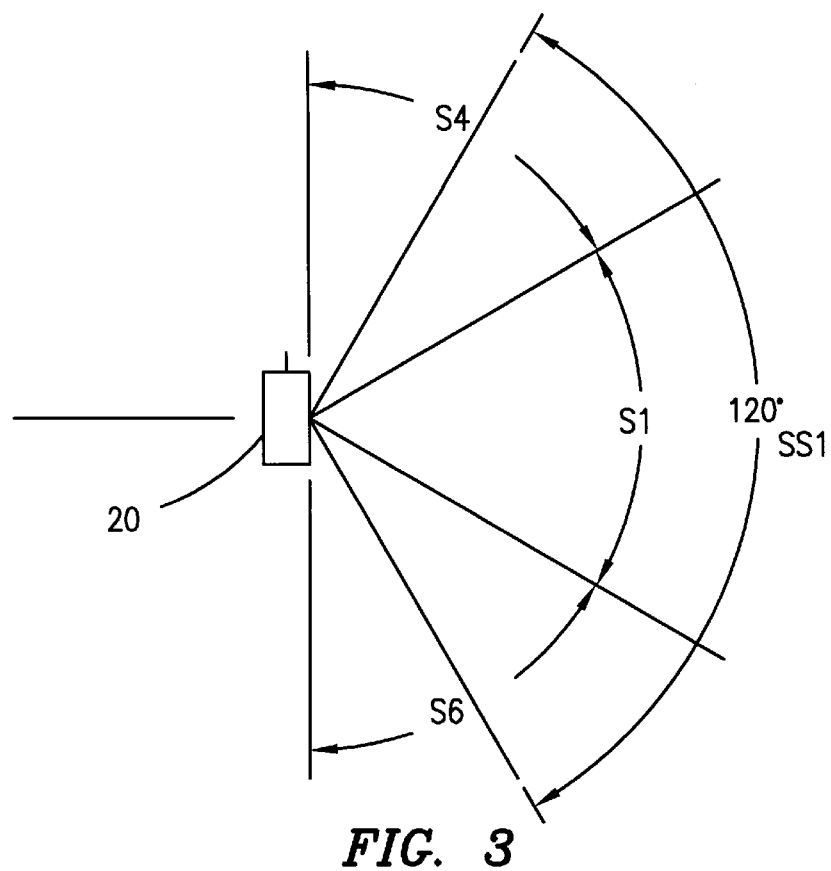
FIG. 3 is a top view of a sector configuration in accordance with a preferred embodiment of the present invention, illustrating the horizontal geographical area coverage of the antennae system of the present invention.

It should also be understood that some sector overlap is preferred in an antennae configuration such as that of the present invention to provide base station redundancy. Thus, a single malfunctioning base station or discrete antenna therein should not result in blocked calls. In said preferred 6-sector antennae construction, therefore, the respective antennae servicing the six sectors must overlap each sector by 60 degrees. Accordingly, each mobile or other wireless subscriber is in the range of at least two different base stations. Shown in FIG. 3 is a top view of an antennae system 20 in accordance with the present invention, illustrating the 60 degrees of geographical area coverage of one such base station (antenna pair) corresponding to a first sector S1 in the figure. As illustrated, however, the antennae servicing sector S1 also overlap two adjacent sectors, i.e., S4 and S6, by 30 degrees each, providing 120 total degrees of geographical area coverage (represented by sector SS1). As noted, this sector redundancy maintains a communications link despite the failure of a particular antenna component within the base station. It should be understood, however, that traffic capacity for that sector may nonetheless be degraded.

Figure 4:
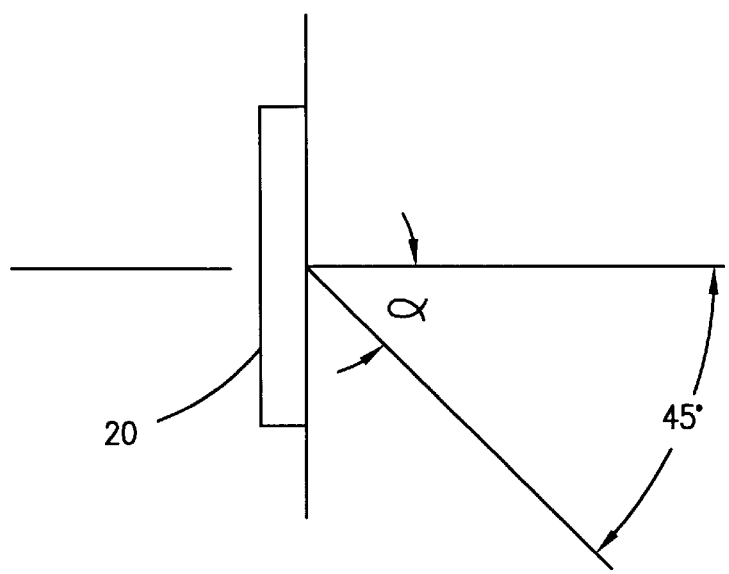
FIG. 4 is a side view of the vertical RF coverage of the present invention, illustrating the preferred coverage below the azimuthal plane.

Referring now to FIG. 4 of the drawings, there is shown a side view of the antennae system 20 of the present invention, illustrating the preferred RF coverage in the vertical as opposed to the horizontal plane of FIG. 3. Since virtually all communication links to the respective base stations (antenna pairs) within antennae system 20 are below the azimuth, i.e., a horizontal plane extending outward from the base stations, it is preferred to concentrate RF coverage below the azimuth to maximize performance. The assumption, of course, is that the vast majority of mobile telephones and other wireless devices will be below the elevated antennae system 20, and RF transmissions above the azimuth are for the most part wasted. The angle of declension alpha ($\alpha$) is preferably fairly steep, e.g., about 45 degrees.

As described, in order to achieve maximum diversity gain two paired antennae, i.e., a base station for a given sector, must be spatially separated. In accordance with the present invention individual antennae of each antenna pair are placed in adjacent and spaced-apart antennae assemblies, three of which are present in the aforementioned preferred embodiment. As will be described in more detail hereinafter, each such antennae assembly contains four identical directional antennae therein, and each antenna of an antenna pair is both horizontally and vertically displaced from its twin, located in an adjacent antenna assembly, and oriented with its twin, as will be described in more detail hereinafter.

Figure 5:
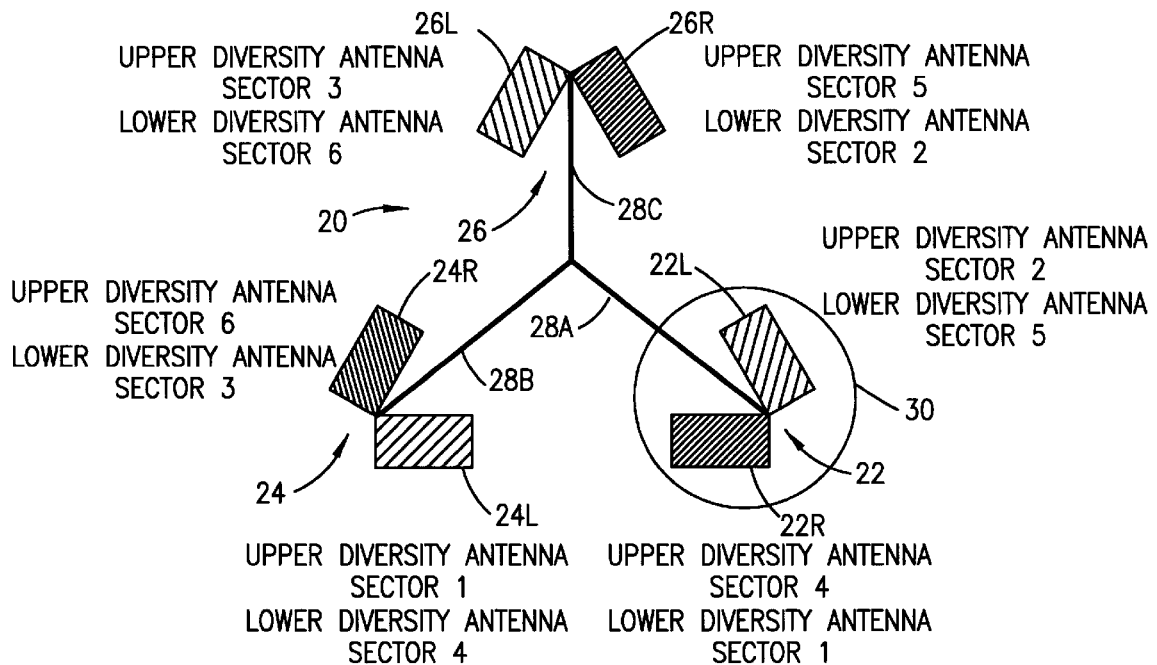
FIG. 5 is a top view of a preferred embodiment of the antenna system of the present invention.
Figure 6:
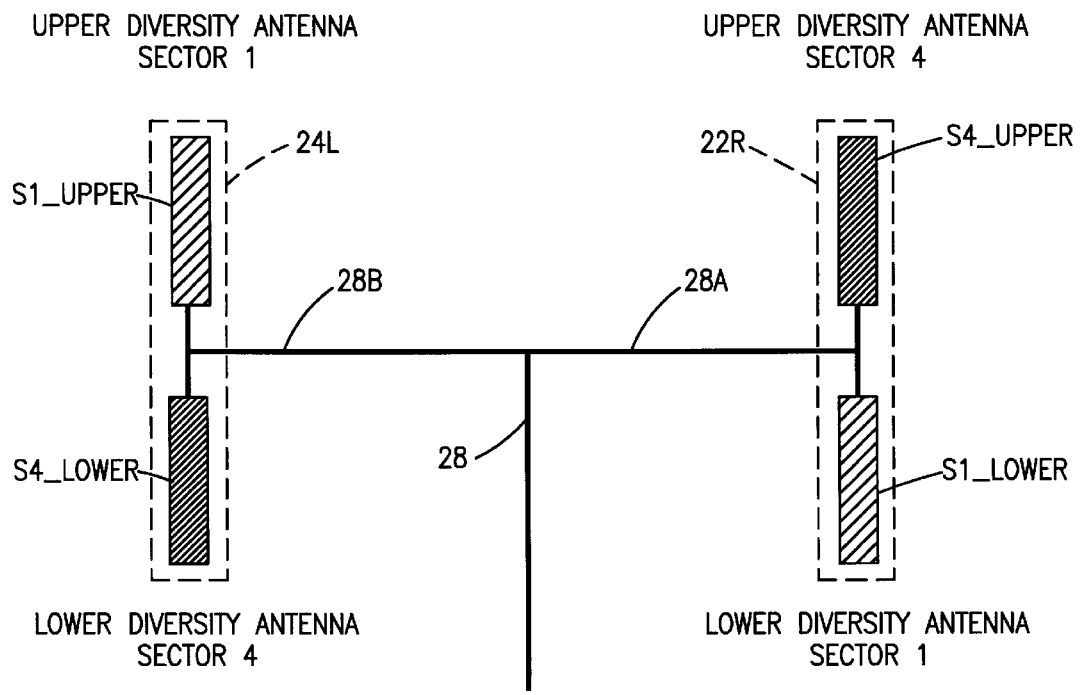
FIG. 6 is a side view of a portion of the antenna system of FIG. 5.

With reference now to FIG. 5 there is shown a top view of the antennae system 20 of the presently preferred embodiment of the present invention having three antennae assemblies 22, 24 and 26 supported on three poles 28A, 28B and 28C, respectively, of a tripartite crossbar or support 28 (shown in more detail in FIG. 6). Antennae assembly 22 contains therein said four identical directional antennae, i.e., one member of four antenna pairs corresponding to sectors 1, 2, 4 and 5, respectively. Antennae assembly 24 contains therein four unpaired antennae corresponding to sectors 1, 3, 4 and 6, respectively, and antennae assembly 26 contains therein four unpaired antennae corresponding to sectors 2, 3, 5 and 6, respectively, as will be described in more detail hereinafter.

With further reference to the antennae system 20 in FIG. 5, each of said antennae assemblies 22, 24 and 26 are divided into left 22L, 24L and 26L and right 22R, 24R and 26R portions thereof, respectively. The four antennae within each said assembly are also arranged in a particular way. For example, the left portion of 22L of antennae assembly 22 contains therein two antennae, one corresponding to sector 2 and the other to sector 5. The right portion 22R of antennae assembly 22 contains an antenna corresponding to section 4 and another to sector 1. Similarly, the left portion 24L contains two antennae corresponding to sectors 1 and 4, and the right portion 24R contains two antennae corresponding to sectors 6 and 3, respectively. Also, the left portion 26L contains two antennae corresponding to sectors 3 and 6, and the right portion 26R contains two antennae corresponding to sectors 5 and 2, respectively.

As also shown in FIG. 5, adjacent portions of the assemblies 22, 24 and 26 are aligned. For example, the right portion 22R of antennae assembly 22 is horizontally aligned with the left portion 24L of antennae assembly 24, situated to the right or dexter of portion 22R (moving in a clockwise direction about the common point of reference). Similarly, the right portion 24R of antennae assembly 24 is aligned with the left portion 26L of antennae assembly 26, and the right portion 26R of antennae assembly 26 is aligned with the left portion 22L of antennae assembly 22. In this manner, the respective paired antennae servicing a given sector are horizontally displaced, e.g., the right portion 22R contains one antenna for sector 4 and another antenna for sector 1, and the corresponding left portion 24L contains the respective antennae twins, spaced therefrom.

With reference now to FIG. 6, there is shown a side front view of a portion of the antennae system 20 of FIG. 5 further illustrating the aforedescribed aligned right portion 22R and left portion 24L of antennae assemblies 22 and 24, respectively. As noted, the respective discrete antennae of each antenna pair therein are horizontally displaced form each other across poles 28A and 28B, respectively, of crossbar or support 28. For better diversity gain one antenna of an antenna pair, e.g., the antenna corresponding to sector 4 in right portion 22R, designated as antennae S4_upper, is mounted high, and the other, i.e., the corresponding antenna for sector 4 in left portion 24L of the adjacent and dexter antennae assembly 24, designated as antenna S4_lower, is mounted low. Similarly, the (base station) antennae for sector 1 are mounted low in right portion 22R (S1_lower) and high in left portion 24L (S1_upper), respectively. With additional reference to FIG. 5, the antennae pair for sector 3 are accordingly mounted high in left portion 26L and low in right portion 24R, and the antennae pair for sector 6 are mounted high in right portion 24R and low in left portion 26L. Likewise, the antennae pair for sector 2 are mounted high in left portion 22L and low in right portion 26R, and the antennae pair for sector 5 are mounted low in left portion 22L and high in right portion 26R. In this manner, the respective paired antennae (base stations) servicing a given sector are uniformly vertically displaced from one another, which along with the horizontal displacement maximizes diversity gain by optimally de-correlating the antennae signals.

Figure 7:
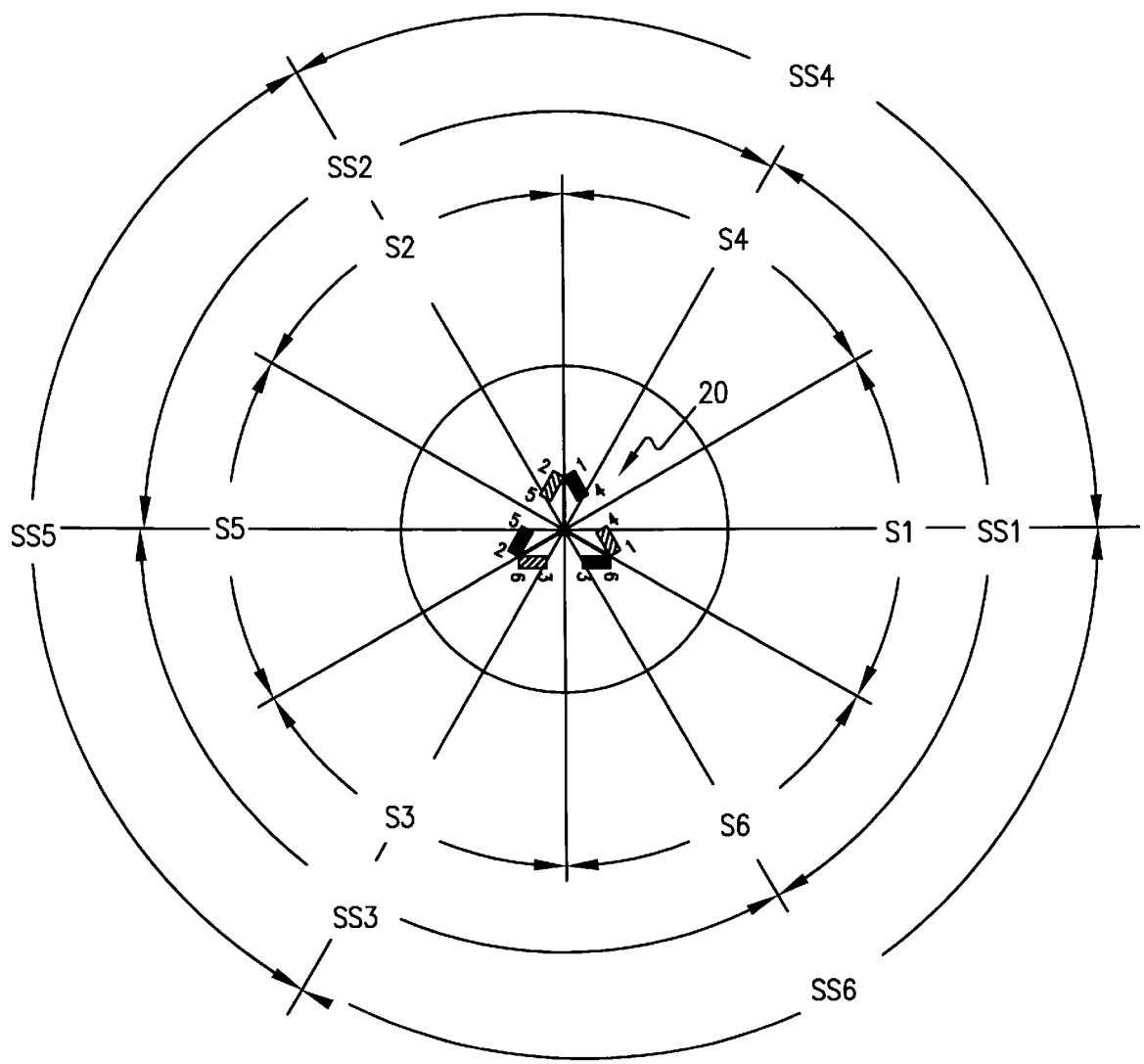
FIG. 7 is a top view of the antenna system of FIG. 5 with the representations of the RF sector coverage associated with the respective antenna pairs within said antenna system.

The 6-sector configuration of preferred embodiment of the present invention is further illustrated with reference to FIG. 7 (and also FIG. 3). As noted, first sector S1 encompasses 60 degrees about the common point of reference, i.e., antennae system 20, and sectors S4 and S6 adjoin sector S1 counterclockwise (left or sinister) and clockwise (right or dexter) therefrom, respectively. Similarly, sectors S2, S5 and S3 are aligned about the common point of reference as illustrated in FIG. 7. As also noted, however, each antenna pair for each sector includes redundancy coverage, which in this embodiment constitutes a 30 degree angular offset into the adjacent sectors. For example, the immediate antenna coverage for S1 covers, as indicated, an arc of 60 degrees, and the broader coverage, including the two 30 degree offsets into sectors S4 and S6, is indicated by said 120 degree arc SS1. Similarly, the indicated arcs for the other sectors, e.g., SS2–SS6, are illustrated in FIG. 7, each overlapping their neighboring sectors in the aforementioned manner.

It should be understood that the angular offsets of 60 degrees in the horizontal plane between the paired pairs of antennae, e.g., the antennae for sectors 1 and 4 resident in the right 22R and left 24L portions, may be implemented either by mechanical rotation or by an antenna radiation pattern, as is understood by those skilled in the art. The other paired pairs, i.e., sectors 2 and 5 and 3 and 6 may be likewise implemented to achieve the requisite degree of phase offset. Similarly, the preferred sub-azimuth transmission pattern may likewise be achieved either by a mechanical tilt device or by an antenna radiation pattern.

It should additionally be understood that the three antennae assemblies 22, 24 and 26 are preferably mounted to the poles 28A, 28B and 28C, respectively, with horizontal brackets, each bracket holding the respective assembly and mounted at the top, middle or bottom of said assemblies. It should be understood that the aforedescribed symmetrical antennae configuration minimizes bracket torque during wind load. Further, the four lone antennae within each assembly are preferably covered by a plastic dome 30, shown surrounding antennae assembly 22 in FIG. 5, to relax the environmental requirements on antenna materials. It should also be understood that four coaxial cables (not shown), one for each antennae in each assembly, being of substantially identical lengths, are coded to ease installation. Furthermore, the three antennae assemblies 22, 24 and 26 of the preferred embodiment may be bracketed on the tripartite crossbar 18 or other such support or mast or on the edges of a high building.

The symmetry of the aforedescribed antennae system 20 configuration, with equivalent horizontal and vertical antenna pair separation therein, means that under identical propagation conditions, all antennae pairs will have substantially the same diversity gains. Therefore, the symmetrical configuration of the preferred embodiment maximizes coverage area uniformity, which as discussed, eases cell planning.

It should, of course, be understood that other configurations are possible and are within the scope of the present invention. For example, an eight-sector antennae system has sector angles of 45 degrees, which with 22.5 degrees of overlapping onto neighboring sectors means 90 total degrees of coverage for each antenna pair, as described hereinbefore. Although having a potentially higher traffic capacity and larger coverage area, the consequent hardware and implementation costs of this 8 antenna pair system are higher. The angle of sector separation ($\beta$) for the above and other embodiments of the present invention are governed by the following equation:

$$\beta = 360/2n \text{ degrees.}$$

Thus, where n=3, the presently preferred embodiment, the sector separation angle ($\beta$) is 60 degrees. For n=4, $\beta$=45 degrees, n=5, $\beta$=36 degrees, and n=6, $\beta$=30 degrees. It should additionally be understood that the number of sectors ranges from 3 to 10, where the preferred embodiment is in the range of 6 to 10, more preferred 6 to 8, and the presently most preferred 6 sectors. Consequently, the number of antenna pairs servicing those sectors is determined accordingly.

It should also be understood that although antennae gain may be maximized by radiating RF signals only below the azimuth, in an alternate embodiment of the present invention RF signals are also radiated above the azimuthal plane.

It should further be understood that the aforedescribed diversity gains achieved by the novel configuration of the present invention apply not only to reception of RF signals but also along the reverse path, i.e., transmission from the respective base stations or antenna pairs, e.g., S1_upper and S1_lower in FIG. 6, particularly where the uplink and downlink propagation characteristics do not change significantly.

It should also be understood that since the horizontal displacement of the antennae in an antenna pair contributes the most to diversity gain, the respective antennae in each antenna pair are preferably horizontally spaced apart from about 2 to about 4 meters.

The previous description is of a preferred and alternate embodiments for implementing the invention, and the scope of the invention should not necessarily be limited by this description. The scope of the present invention is instead defined by the following claims.

What is claimed is:

1. An antenna system for transceiving RF signals within a given geographic area, said area being divided into a multiplicity of discrete and substantially equivalent sectors each having a common point of reference from about said antenna system, said antenna system comprising:

a multiplicity of antenna pairs, each of said antenna pairs corresponding to a respective one of said sectors, each antenna within a respective antenna pair having substantially the same orientation from said common point of reference; and a multiplicity of antenna assemblies substantially aligned about said common point of reference, each of said assemblies having a right and a left portion thereof, the right portion of each of said antenna assemblies containing at least one first antenna of a respective antenna pair, the left portion of the respective antenna assembly being spaced-apart and horizontally displaced from and dexter to each said right portion containing at least the corresponding second antenna of said antenna pair, a given first antenna of at least one antenna pair in said antenna system being both horizontally and vertically displaced from the corresponding second antenna.

2. The antenna system according to claim 1, wherein each said first antenna within said antenna system is both horizontally and vertically displaced from the corresponding second antenna of each said antenna pairs.

3. The antenna system according to claim 1, wherein the number of said multiplicity of antenna pairs in said antenna assemblies ranges from 3 to about 10.

4. The antenna system according to claim 3, wherein said multiplicity of antenna pairs ranges from 6 to 8.

5. The antenna system according to claim 4, wherein said multiplicity of antenna pairs equals six antenna pairs.

6. The antenna system according to claim 4, wherein said multiplicity of antenna pairs equals eight antenna pairs.

7. The antenna system according to claim 1, wherein each said antenna of each said antenna pair is horizontally displaced from the respective other antenna of said antenna pair by an amount ranging from about 2 to about 4 meters.

8. The antenna system according to claim 1, wherein each said antenna assembly is covered by a plastic dome.

* * * * *